April 1, 1969     L. B. SAND     3,436,174
SYNTHETIC MORDENITE AND PREPARATION THEREOF
Original Filed March 12, 1963
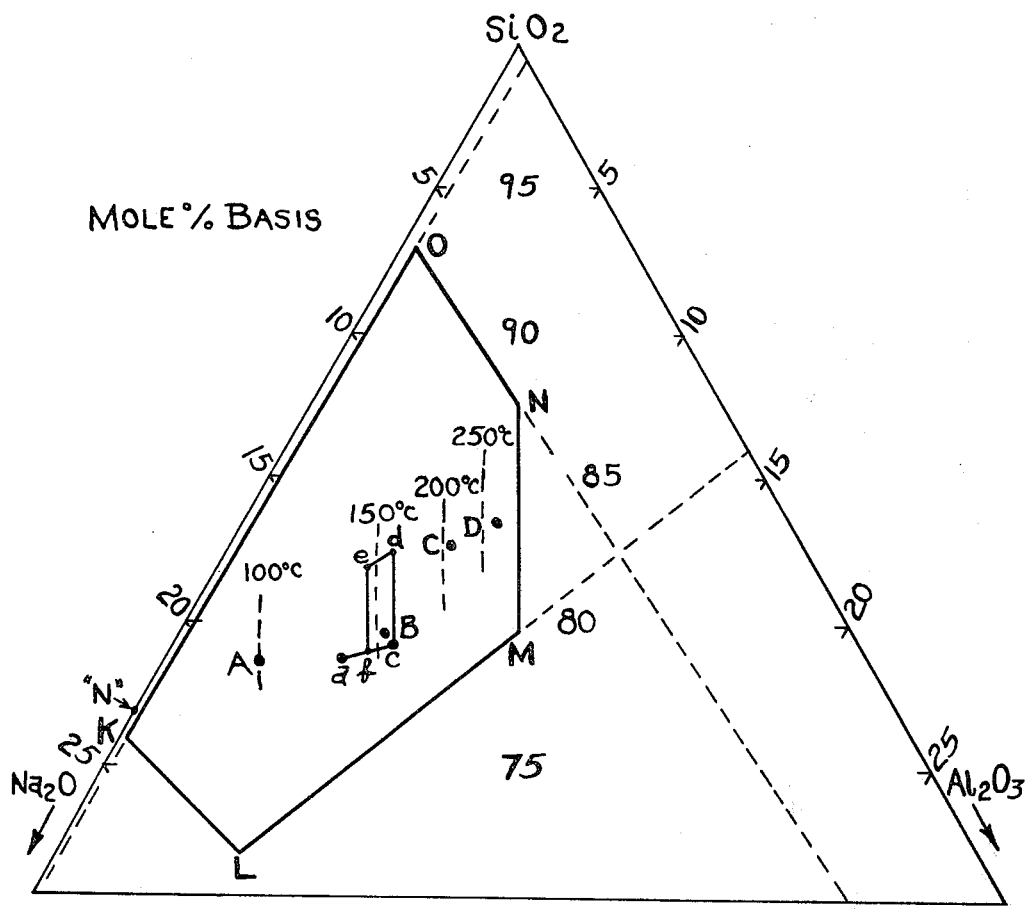
INVENTOR.
LEONARD B. SAND
BY
ATTORNEY

3,436,174
SYNTHETIC MORDENITE AND PREPARATION THEREOF

Leonard B. Sand, Holden, Mass., assignor to Norton Company, Worcester, Mass., a corporation of Massachusetts
Continuation of application Ser. No. 264,523, Mar. 12, 1963. This application Oct. 18, 1967, Ser. No. 676,228
Int. Cl. C01b 33/28
U.S. Cl. 23—113    6 Claims

ABSTRACT OF THE DISCLOSURE

Synthetic mordenite, capable of intracrystalline adsorption of benzene and molecules larger than 5 A. is prepared by hydrothermal synthesis in a water, soda, alumina, silica system including sodium silicate at temperatures below 260°, with a batch composition mole ratio of water to soda of from 6 to 300; with the water to soda ratio not exceeding 180 when temperatures below 200° C. are employed. Acid treatment of the product can reduce the aluminum content of the crystals, which are useful for ion exchange, adsorption and catalytic applications.

---

This application is a continuation of application Ser. No. 264,523, filed Mar. 12, 1963, now abandoned, which in turn is a continuation-in-part of application Ser. No. 80,552, filed Jan. 4, 1961, now abandoned.

The present invention relates to synthetic zeolites.

It is an object of the present invention to prepare a synthetic zeolite having a high silica content.

It is an object of the present invention to prepare a synthetic mordenite.

Another object is to obtain more rigid control of the composition of the synthetic mordenite crystals.

A further object is to prepare a zeolite which can be employed as a molecular sieve for the adsorption of molecules larger than 5 A.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by autoclaving siliceous volcanic glass, e.g., commercial pumice, with aqueous sodium silicate solution usually under saturated vapor pressure.

The temperature for completion of the reaction within a reasonable time is preferably between 120° C. and 190° C. The reactants crystallized completely at 175° C. in 24 hours.

The pumice is preferably ground to a particle size of less than 5 microns. The sodium silicate solution is usually of 27 to 38% concentration.

The ratio of the pumice to sodium silicate can be varied but usually there are employed ½ to ⅔ parts of pumice to each part by weight of sodium silicate solution.

EXAMPLE I

In a specific example, 1 part of finely divided pumice was placed in an autoclave with 2 parts of a 32% aqueous sodium silicate solution and the mixture heated for 24 hours at 150° C.

There were recovered synthetic mordenite crystals which had a chemical analysis almost identical with that of the starting pumice. This is shown by the following table comparing the analysis of the volcanic glass by the commercial supplier with the analysis of the synthetic mordenite obtained.

|  | Volcanic Glass, Percent | | Synthetic Mordenite, Percent | |
|---|---|---|---|---|
| SiO₂ | 70.16 | | 70.29 | |
| Al₂O₃ | 14.33 | 14.33 | 13.32 | 14.16 |
| Fe₂O₃ | trace | | 0.84 | |
| TiO₂ | (¹) | | 0.08 | |
| CaO | 0.76 | | 0.60 | |
| MgO | trace | | 0.17 | |
| Na₂O | | 7.73 | 4.27 | 7.70 |
| K₂O | | | 3.43 | |
| Ignition Loss | 7.02 | | 6.68 | |

¹ Not determined.

The synthetic mordenites of the present invention are characterized by having a much lower calcium content than most natural mordenite, e.g., less than 1% CaO as against 2–4% for most natural mordenites.

The above analysis may be expressed by the following elemental formula:

$$\left(Na, K, \frac{Ca}{2}\right)_2 Al_2 Si_9 O_{22} \, 2.8 \, H_2O$$

By the present invention, it is thus possible to control the chemical composition of the product by the choice of volcanic glass. This is of importance in the use of the products as molecular sieves since molecular sieve properties are known to be affected by the kind and relative amounts of the alkali and/or alkaline earth ions present in the crystals and by the Al₂O₃:SiO₂ ratio. Consequently, by choosing a volcanic glass having the chemical analysis desired for the molecular sieve there will be produced a molecular sieve having the requisite properties. Thus, there is eliminated the difficulties normally encountered when mixtures of chemicals are employed and the results are not completely reproducible.

The synthetic mordenites of the present invention are in the nature of zeolites and can be used as ion exchangers, molecular sieves, catalysts, catalyst supports and organic catalyst carriers. The acid hydrolized products are particularly useful as catalysts, desiccants, etc., in acid systems.

The synthetic sodium mordenites referred to hereafter are superior to the natural mordenites as ion exchangers for monovalent, divalent and trivalent cations. Their properties for many of these uses are substantially enhanced by acid leaching to remove a substantial portion of the alkali metal component. In the leaching there can be employed any strong acid, e.g., sulfuric acid, hydrochloric acid, hydrobromic acid, phosphoric acid, nitric acid, etc. Preferably, hydrochloric acid is utilized.

EXAMPLE II

One hundred parts of the synthetic mordenite prepared in Example I were treated with 400 parts of 1 N HCl at room temperature for ½ hour. The acid-treated material had the following analysis:

| | Percent |
|---|---|
| SiO₂ | 74.57 |
| Al₂O₃ | 13.51 |
| Fe₂O₃ | 0.61 |
| TiO₂ | 0.05 |
| CaO | 0.64 |
| MgO | 0.13 |
| Na₂O | 0.19 |
| K₂O | 2.20 |
| Ignition loss | 7.68 |

The products of Examples I and II are both good desiccants even at low concentrations of water and can be used to dry a material to very low water content. Thus, the product of Example I after drying at 300° C. adsorbed 15% of water at 100% relative humidity and room temperature and adsorbed 47% of its adsorptive capacity at 1% relative humidity. The product of Example II after drying at 300° C. adsorbed 10% of water at 100% relative humidity and room temperature and adsorbed 34% of its adsorptive capacity at 1% relative humidity.

Furthermore, the products of the present invention can be regenerated by adsorbed water removal by simple heating; even as high as or higher than 700° without change in crystal structure.

Published work on the molecular sieve properties of natural and synthetic mordenites have not shown that they will adsorb molecules larger than about 4 A.

The products of both Examples I and II adsorbed n-heptane, benzene and cyclohexane in significant amounts. Hence, they are capable of adsorbing molecules above 5 A. (maximum dimension of the minimum projected cross-section). In general, the products from which the alkali metal component has been removed have a higher capacity for adsorbing large organic molecules. Thus acid hydrolyzed synthetic mordenites prepared from pumice or amorphous silica also have molecular sieve properties for organic molecules greater than 5 A.

Most zeolites, including commercial materials such as Linde's 4A, 5A and 13X, decompose in acids. However, the high silica mordenite-type of zeolite of Example I is only partially affected by acid, i.e., there is a reduction in sodium and potassium content, but the crystal structure is unchanged. Stripping of the exchangeable ions can be achieved either partly or completely by the acid treatment, leaving the aluminum-silicon-oxygen network intact. The generalized formula for mordenite which is given in Example III, below, would thus be, for the completely acid exchanged material:

$$H_2Al_2Si_{9-10}O_{22-24}(H_2O)_{6.7}$$

This unique property for zeolitic material results in a microporous material in Example II having a total surface area of 350 m.²/gm. ($N_2$ Brunauer, Emmett, Teller method) which is unchanged after heating at 700° C. for three days. The product of Example II is eminently suited for use in acid systems where present commercial zeolites are unsatisfactory.

While only the alkali metal component was stripped in Example II it is also possible to progressively strip the aluminum content of the product by utilizing stronger acid. Thus, the aluminum oxide content can be removed partly by treatment with 6 normal $H_2SO_4$ for 1 hour, the resulting product having a silicon-aluminum-oxygen network and is an excellent catalyst and catalyst support for use in acid systems.

It has also been found that synthetic mordenite can be prepared at relatively low temperatures, e.g., 75° to 175° C. by utilizing finely divided amorphous silica and sodium aluminate in place of the volcanic glass in the reaction with the sodium silicate solution. When sodium aluminate or other soluble aluminate is employed the amount can be varied but normally is ⅕ to ⅙ parts for each part by weight of sodium silicate solution and ⅓ to ¼ parts for each part by weight of amorphous silica.

EXAMPLE III

In a specific example, 340 parts of amorphous silica were heated to 150° C. with 100 parts of sodium aluminate (1.1 $Na_2O \cdot Al_2O_3 \cdot 3H_2O$) and 590 parts of a 28% solution of sodium silicate in an autoclave for 24 hours. This synthetic mordenite prepared from the amorphous silica had the formula $Na_2Al_2Si_{10}O_{24}(H_2O)_{6.7}$ as compared to the general formula

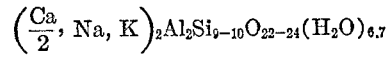

for natural mordenites and the synthetic mordenite containing calcium and potassium as well as sodium of Example I. Analysis of the synthetic mordenite of Example III after acid treatment shows a reduction of the sodium content of from 6.06% in the starting mixture to 0.08% in the treated composition and a small reduction in the proportion of aluminum present in relation to the $SiO_2$ when dried at a temperature of 110° C. The synthetic mordenite of Example III has the same uses as that of Example I.

The synthetic mordenite of Example III can be acid leached in the manner shown in Example II to give an alkali metal free synthetic mordenite $$H_2Al_2Si_{10}O_{24}(H_2O)_{6.7}.$$

The water of crystallization can vary from 0 to about 6.7 mols. Sulfuric acid leached synthetic mordenite from amorphous silica had a surface area B.E.T. ($N_2$—m.²/g.) of 445.

The n-heptane number of the synthetic mordenites of the present invention as compared with commercially available synthetic zeolites Linde 4A and Linde 5A and natural mordenite are shown in the following table.

| | |
|---|---|
| Linde 4A | 0 |
| Linde 5A | 80 |
| Natural mordenite: | |
|   No leach | 6 |
|   HCl leach | 28 |
| Volcanic glass mordenite: | |
|   No leach | 25 |
|   HCl leach | 54 |
|   $H_2SO_4$ leach | 59 |
| Amorphous silica mordenite: | |
|   No leach | 26 |
|   HCl leach | 45 |
|   $H_2SO_4$ leach | 87 |

The n-heptane number given for a product expresses the relative reduction per unit weight of material in pressure of the system due to the adsorption of the heptane by the solid. The difference in pressure divided by the weight of the solid product is the adsorption number.

To show that mordenite can be synthesized from a large variety of starting materials, mordenite also was synthesized from the following starting materials and experimental conditions:

EXAMPLE IV

7% by weight of chemical aluminum hydroxide, $Al(OH)_3$, 76.2% by weight of a 37.5% solution of sodium silicate, and 16.8% by weight of diatomaceous earth were mixed and autoclaved at 170° C. saturated vapor pressure, for 16 hours.

EXAMPLE V

Same as Example IV only raw bauxite was used and autoclaved at 175° C. for 24 hours.

EXAMPLE VI 12.5% by weight of kaolinite, 76.5% by weight of a 37.5% solution of sodium silicate, and 11% by weight of diatomaceous earth were mixed and autoclaved at 170° C., saturated vapor pressure, for 16 hours.

EXAMPLE VII 17.1% by weight of phyrophyllite, 78% by weight of a 37.5% solution of sodium silicate, and 4.9% by weight of diatomaceous earth were mixed and autoclaved at 170° C. saturated vapor pressure, for 16 hours.

EXAMPLE VIII 33.7% by weight of expanded perlite, 50.3% by weight of a 28.4% solution of sodium silicate were mixed and autoclaved at 175° C. saturated vapor pressure, for 17 hours.

EXAMPLE IX 12.2% by weight of muscovite mica, 76.6% by weight of a 37.5% solution of sodium silicate and 11.2% by weight of diatomaceous earth were mixed and autoclaved at 170° C. saturated vapor pressure, for 16 hours.

Runs in which mordenite appeared as the predominant phase but appreciable contaminating crystalline material:

EXAMPLE X 6.1% by weight of potassium aluminate, 5.1% by weight of sodium aluminate, 39% by weight of a 27.7% solution of potassium silicate, 22.6% by weight of a 37.5% solution of sodium silicate, and 27.2% by weight of diatomaceous earth were mixed and autoclaved at 175° C., saturated vapor pressure, for 17 hours.

EXAMPLE XI 3.7% by weight of potassium aluminate, 6.3% by weight of sodium aluminate, 24.4% by weight of a 27.7% solution of potassium silicate, 27.8% by weight of a 26.4% solution of sodium silicate, and 25.8% by weight of diatomaceous earth were mixed and autoclaved at 170° C. saturated vapor pressure, for 16 hours.

The preferred limits of temperature for synthesis of the open mordenite (i.e., mordenite capable of significant intracrystalline adsorption of molecules larger than 5 A.), are given above as 120° to 190° C. However, open mordenite has been produced at temperatures as high as 260° C.

At the higher temperatures, the batch composition is much more restricted than at the lower temperatures.

The figure shows a ternary diagram illustrating the compositional limits applicable to the present invention. The area KLMNO represents the area formed by the operative ratios of $Na_2O$ to $SiO_2$ and $SiO_2$ to $Al_2O_3$ and wherein the ratio of $Na_2O$ to $Al_2O_3$ is one or greater. By "operative ratios" we mean the oxide ratios required in the batch composition of reactants in order to produce the open mordenite of this invention, with or without contaminant phases. The area $b\ c\ d\ e$ within the larger area includes the preferred batch compositions for making the highest purity mordenite from amorphous silica under the most desirable temperature and time conditions of autoclaving. The points $a$ and $c$ are the preferred compositional limits given in Example I in which pumice is employed.

Table I, following, gives the adsorption values for mordenite produced from various batch compositions at different temperatures.

TABLE I

| Batch Composition | Ex. No. | Temp., °C. | Time | Benzene Adsorption Value at Room Temperature,* g./G×100 mm. Hg |
|---|---|---|---|---|
| $N_{0.3}A\ S_{27}H_{33}$ (Point A in Fig.) | XII | 100 | 7 days | 4.8 | 44 |
| $N_{2.4}A\ S_{13.3}H_{50}$ (Point B) | XIII | 160 | 24 hours | 7.2 | 43 |
| $N_{1.6}A\ S_{12.6}H_{11}$ (Point C) | XIV | 220 | 16 hours | 4.4 | 46 |
| $N_{1.2}A\ S_{11}H_{33}$ (Point D) | XV | 260 | 24 hours | 4.0 | 44 |

*J. W. McBain, Colloid Symposium Monograph, 4, 7 (1926).
Molal Basis: $A=Al_2O_3$; $H=H_2O$; $N=Na_2O$; $S=SiO_2$.

These typical data exemplify that the batch composition, in order to produce significant amounts of open mordenite (i.e. mordenite capable of adsorbing at least 4% by weight of benzene at 44 mm. of Hg, at room temperature, as in Example XV), varies as a function of the temperature of autoclaving. This relationship is shown graphically in the figure by the dotted lines within the polygon KLMNO which indicate the preferred batch compositions at the temperatures given. Under the conditions specified, mordenite can be produced with a batch composition having silica to alumina ratios of from 6 to 1 to 180 to 1, but a silica to alumina ratio of 10 to 1 up to 50 to 1 represents a preferred area within which the points in Table I fall.

Although not plotted on the figure, the amount of water in the batch composition is important. In general, we have prepared mordenite employing a ratio of $H_2O$ to $Na_2O$ of from 6 to 300. At temperatures below 200° C. in order to prepare open mordenite, the ratio should not exceed 180, the preferred value for producing substantially pure mordenite being 10 to 40. Batch composition and the other variables of the synthesis also affect the amount of water necessary.

The synthetic mordenite made according to the teaching of this invention has the mordenite crystal structure as determined by the X-ray powder diffraction method and the disclosed "open" form has open intra-crystalline channels defined by 12 membered rings believed to have a free diameter of 6.6 A.

The preceding examples show that many and varied starting materials can be employed. In addition to the various minerals and chemicals suggested high purity mordenite has been prepared from silica-alumina gels and solda-silica-alumina gels. Many other combinations of starting materials will be apparent to those skilled in the art.

What is claimed is:

1. A synthetic crystalline zeolite having the mordenite crystal structure having the formula

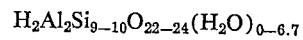

$$H_2Al_2Si_{9-10}O_{22-24}(H_2O)_{0-6.7}$$

and capable of intra-crystalline adsorption of benzene and molecules larger than 5 A.

2. An acid stable synthetic crystalline zeolite having a silica to alumina ratio of from 9:1 to 10:1, having the mordenite crystal structure and being capable of intra-crystalline adsorption of benzene and molecules larger than 5 A.

3. A method for making a zeolite having the mordenite crystal structure and capable of adsorbing benzene and molecules larger than 5 A, comprising reacting in a closed container, under autogenous pressure, a composition containing as its silica source sodium silicate and amorphous silica and having the oxide mole ratios:

| | |
|---|---|
| $Na_2O/SiO_2$ | 0.07–0.30 |
| $SiO_2/Al_2O_3$ | 10–50 |
| $H_2O/Na_2O$ | 6–300 |
| $Na_2O/Al_2O_3$ | at least 1.2 | at a temperature of from 120° C. to 260° C. for a time sufficient to form a zeolite having the mordenite crystal structure, the $H_2O/Na_2O$ ratio not exceeding 180 at a temperature below 200° C.

4. A method for making a zeolite having the mordenite crystal structure and capable of adsorbing benzene and molecules larger than 5 A, comprising reacting in a closed container, under autogenous pressure, a composition having the oxide mole ratios:

| | |
|---|---|
| $Na_2O/SiO_2$ | 0.07–0.30 |
| $SiO_2/Al_2O_3$ | 10–50 |
| $H_2O/Na_2O$ | 6–300 |
| $Na_2O/Al_2O_3$ | at least 1.2 | at a temperature of from 150° C. to 260° C. for a time sufficient to form a zeolite having the mordenite crystal structure, the $H_2O/Na_2O$ ratio not exceeding 180 at a temperature below 200° C.

5. A method as in claim 3 wherein the reaction product is further treated with mineral acid to produce hydrogen exchanged mordenite.

6. A synthetic zeolite having the mordenite crystal structure, consisting essentially of aluminum, silicon, hydrogen and oxygen, and having a silicon to aluminum ratio of greater than as synthesized as a result of acid treatment, and being capable of intra-crystalline adsorption of benzene and molecules larger than 5 A.

References Cited

UNITED STATES PATENTS

| | | | |
|---|---|---|---|
| 3,130,006 | 4/1964 | Rabo et al. | 23—112 X |
| 3,130,007 | 4/1964 | Breck | 23—113 |
| 3,334,964 | 8/1967 | Reid | 23—113 |

OTHER REFERENCES

Barrer: J. Chem. Soc. (1948), pp. 2158–2163.
Barrer: Nature, vol. 164, July 16, 1949, pp. 112–113.

EDWARD J. MEROS, *Primary Examiner.*

U.S. Cl. X.R.

23—111